United States Patent [19]

Moseley

[11] Patent Number: 5,800,948
[45] Date of Patent: Sep. 1, 1998

[54] LEAD-ACID BATTERY AND SEPARATOR THEREFOR

[75] Inventor: Patrick T. Moseley, Chapel Hill, N.C.

[73] Assignee: International Lead Zinc Research Organization, Inc., Chapel Hill, N.C.

[21] Appl. No.: 772,001

[22] Filed: Dec. 19, 1996

[51] Int. Cl.$^6$ .............................. H01M 2/16; H01M 2/18
[52] U.S. Cl. ........................ 429/204; 429/246; 429/247
[58] Field of Search ............................ 429/204, 246, 429/247

[56] References Cited

U.S. PATENT DOCUMENTS

| Re. 15,067 | 3/1921  | Baird ............................ 429/255 |
|------------|---------|---------------------------------------------|
| 3,379,570  | 4/1968  | Berger et al. ..................... 136/6   |
| 3,861,963  | 1/1975  | Afrance et al. ................. 429/246    |
| 4,648,177  | 3/1987  | Uba et al. ...................... 29/623.2  |
| 4,908,282  | 3/1990  | Badger .......................... 429/59    |
| 5,328,783  | 7/1994  | White ........................... 429/233   |
| 5,468,575  | 11/1995 | Holland et al. .................. 429/204   |
| 5,514,494  | 5/1996  | Stempin et al. .................. 429/204   |

OTHER PUBLICATIONS

Lewis, Ed. "Hawley's Condensed Chemical Dictionary Twelfth Edition" Van Nostrand Reinhold, Publisher pp. 561–562 No month availible, 1993.

Kirk–Othmer. "Encyclopedia of Chemical Technology, Fourth Edition, vol. Five." pp. 599–602, No month available, 1993.

Primary Examiner—Prince Willis, Jr.
Assistant Examiner—Carol Chaney
Attorney, Agent, or Firm—Baker & Botts, L.L.P.

[57] ABSTRACT

There is disclosed a lead acid battery and battery separator, the separator comprising a porous ceramic body manufactured from ceramic fibers welded together at their respective contact points such that the resulting separator body is substantially rigid and non-compressible and wherein the separator has a porosity of at least about 90%. The electrodes of the battery may be comprised of a similar porous ceramic material impregnated, respectively, with Pb and $PbO_2$. A lead-containing foil may be maintained in close contact with each of the electrodes as current collectors attached to the battery terminals.

15 Claims, 1 Drawing Sheet

LEAD-ACID BATTERY AND SEPARATOR THEREFOR

BACKGROUND OF THE INVENTION

The present invention is directed to rechargeable lead-acid storage batteries. Such batteries are typically used in automobiles and boats, and in stationary equipment such as generators and compressors.

The construction and operation of such batteries are well known. For example, U.S. Pat. No. 5,514,494, the disclosure of which is incorporated herein by reference, describes a rechargeable battery having all of the basic components of the present invention.

As described and discussed in the '494 patent, an individual cell of a typical lead-acid storage battery has two electrodes, a positive electrode and a negative electrode. The two electrodes are placed in an electrolyte, typically an acid such as sulfuric acid, and a current is thence generated by ion transfer through the electrolyte.

In order to maintain separation between the electrodes, and to prevent short circuiting, a separator is employed. The '494 patent describes a separator that is light, relatively rigid, and sufficiently porous (i.e., 40–90%) to enable the electrolyte to penetrate the separator and thereby maintain ion transfer through the separator and between the electrodes. The '494 patent further describes the desirability of providing an electrode that is relatively light, and yet rigid and strong enough to lessen the need for a heavy container and/or electrodes.

U.S. Pat. No. 5,328,783 also describes a lead-acid battery having a self-supporting ceramic plate. The disclosure of the '783 patent, which is also incorporated herein by reference, does riot describe the specific structure of this plate.

SUMMARY OF THE INVENTION

It is the objective of the present invention to provide a rechargeable battery that is lighter than batteries heretofore known. The improvement offered by the battery according to the invention resides in the structure and composition of the battery separator, and optionally in the composition and structure of the electrodes.

The battery separator according to the invention has a porosity exceeding 90%, and yet is sufficiently rigid and strong to permit the use of smaller and lighter electrodes, thereby lessening the overall mass and weight of the battery. Also, because the separator can maintain its relative rigidity and strength throughout repeated charge/discharge cycles, the degradation previously associated with lead-acid batteries can be reduced, thus improving overall battery life.

According to the invention, the separator is comprised of a highly porous ceramic plate (i.e., up to about 95% porous) manufactured from aggregates of ceramic needles. These needles are formed by conventional methods from inorganic materials such as silica, alumina or mullite. These ceramic needles are molded into the desired shape (e.g. plate) and subjected to heat treatment such that they become welded together at their points of contact. The resulting separator is porous enough to permit the electrolyte to penetrate the pores of the separator and provide a continuous ion path between the electrodes.

The electrodes also can be modified according to the invention. Thus instead of using relatively massive lead grids as the electrode supports, structures similar to the porous ceramic separator may be employed. These structures may be impregnated with the active electrode material ($PbO_2$ for the positive electrode; Pb for the negative electrode) and relatively thin (e.g. foil) current collectors may then be attached to the surface of the impregnated porous ceramic structure.

What results is a battery cell comprised of a relatively strong and light sandwich-like structure that offers ease of construction and long life.

BRIEF DESCRIPTION OF THE DRAWING

The battery according to the invention is further described below with reference to the following drawing, wherein.

DESCRIPTION OF THE PREFERRED EMBODIMENT

Figure 1:
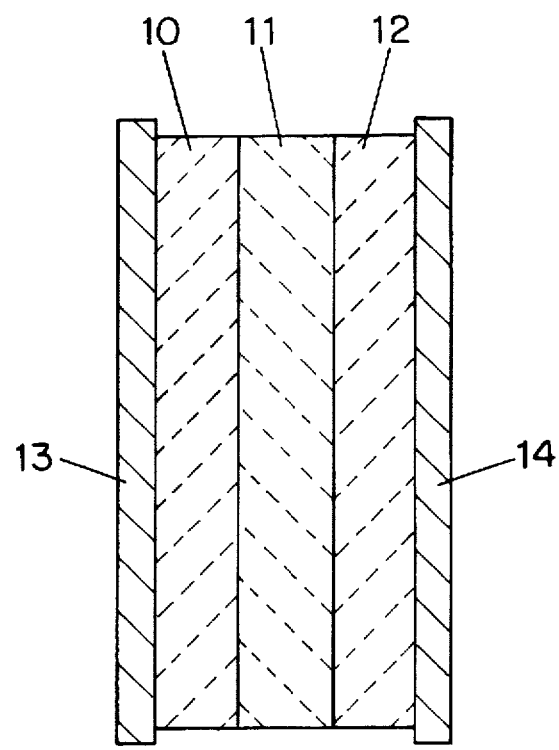
FIG. 1 is a schematic side view of a battery cell according to the invention.

The ceramic plates or tiles 10, 11, 12 of FIG. 1 are comprised of ceramic needles that have been packed together and welded together by heat treatment to form a highly porous, rigid structure.

The physical composition of such plates are not new in-and-of themselves. Indeed, such compositions, formed into tiles, have gained notoriety as the insulating tiles on areas of the skin of the space shuttle that are subject to heat friction during reentry into the earth's atmosphere.

Given the notoriety surrounding the development and successful use of these insulating tiles, their composition and method of manufacture is similarly well-known. For example, a preferred embodiment is comprised of silica fibers marketed by Schuller International Group, Inc. under the trademark Q-Fiber®. These fibers are comprised of approximately 99.7% $SiO_2$, and have average diameters of 1.4±0.1 microns. Individual fibers range approximately between 0.1 microns and 13 microns.

According to the invention, the fibers are formed into rigid cast sheet or plate forms by sintering such that the fibers weld together at their points of contact. The resulting sheets are highly porous, having a porosity exceeding 90% and preferably of about 95%. The mean pore radius is preferably within the range 10 to 50 microns.

The same very high porosity, rigidity and strength of the ceramic plates developed for the space shuttle render these plates uniquely suitable for use in a battery as a separator and, optionally, as supporting structures for the active electrode materials.

The plates 10, 11, 12 may be constructed and treated and formed into a battery cell as follows:

Separator plate 11 is of a size and thickness appropriate for the type of battery in question. For a typical automobile battery, a plate approximately 75 to 300 mm wide by 75 to 300 mm high by 1 mm to 10 mm thick can be used. The plate is impregnated with a suitable electrolyte (e.g. $H_2SO_4$) simply by soaking the plate in the electrolyte for a time sufficient to ensure substantially full penetration. Agitation and/or pressure and/or vacuum evacuation of the plate may be used to facilitate this process, as will the natural wickability of the porous structure. In this regard, the relatively small pore size ensures the desired degree of wickability.

Similarly sized plates may also be used as supporting structures for the active electrode materials. In the case of the positive plate 10, it is impregnated with lead dioxide. Lead dioxide powder having a particle size substantially smaller than the mean pore size of the plate, for example from about 1 to 5 microns in particle size, is used. The lead dioxide powder is mixed with water or dilute sulfuric acid (e.g. up to 5 molar) to form a slurry. This slurry is introduced into the pores of the plate by a process of immersion, agitation, pressure and/or pre-vacuum evacuation of the plate.

The negative plate may be similarly impregnated with a slurry containing the active material.

As is known in the art, a lead compound (e.g. PbO) can be impregnated into both the negative and positive plates. The active materials in the plates can then be "formed" in place by passing a formation current through the cell to convert the lead compound in the negative plate to metallic lead and the lead compound in the positive plate to $PbO_2$.

After all three plates 10, 11, 12 are appropriately impregnated, they are compressed together as shown in FIG. 1 to form a cell. An excess of electrolyte may be used by immersing the three-plate cell in electrolyte. Similar cells are preferably constructed and connected in series so as to form the entire battery.

The three-plate cell is connected to current collectors 13, 14. These collectors may be any conductive material capable of withstanding the acid electrolyte environment. In a typical lead-acid battery the current collectors are comprised of a lead grid impregnated with active ingredient paste. In the present case, where the active ingredients are supported in substantially rigid, porous ceramic plates, the current collector preferably is a thin metal foil, preferably a foil of lead or lead alloy 13, 14, maintained in close contact with the outside of each of the plates as shown in FIG. 1. Such a foil is preferably no more than about 0.01 inches in thickness, e.g. from about 0.01 inches to about 0.001 inches, both to reduce weight and to increase flexibility and close surface contact with the plate and active material supported therein.

In this regard, the normal thickness of a lead plate around which the electrodes are constructed in a conventional lead-acid battery is between 1 and 3 millimeters. It can thus be appreciated that the use of a thin metal foil, rendered possible because the foil need not perform a structural integrity function, would permit a considerable weight saving.

A battery cell including a separator and/or electrodes according to the invention is durable in that the separator and/or electrode body has relatively high mechanical strength (witness the utility of similar materials as insulating tiles on the space shuttle), is substantially non-compressible, and resists swelling and deforming under charging/discharging cycles. As is understood in the art, the tendency of battery components, including separators and electrodes, to swell and change shape during use too often results in premature degradation and battery failure.

I claim:

1. A separator for a lead-acid battery comprising a porous ceramic body comprising ceramic fibers welded together at their respective contact points such that the resulting separator body is substantially rigid and non-compressible and wherein the separator has a porosity exceeding about 90% by volume, said separator having pores that are substantially filled with battery electrolyte.

2. A separator for a lead-acid battery according to claim 1, said separator being comprised of an inorganic ceramic material selected from silica, alumina or mullite.

3. A separator for a lead-acid battery according to claim 2, said separator comprising silica.

4. A separator for a lead-acid battery according to claim 2, said separator comprising fibers having diameters within the range 0.1 to 13 microns.

5. A lead-acid battery comprising two electrodes, a positive electrode and a negative electrode each comprising support means for active material, a separator supported between the electrodes, said separator comprising a porous ceramic body comprising ceramic fibers welded together at their respective contact points such that the resulting separator body is substantially rigid and non-compressible, and wherein the separator has a porosity exceeding about 90% by volume.

6. A lead-acid battery according to claim 5, said separator having pores that are substantially filled with battery electrolyte.

7. A lead-acid battery according to claim 5, wherein the positive electrode support means comprises a ceramic body comprising ceramic needles welded together at their respective contact points such that the resulting electrode support means is substantially rigid and non-compressible, said ceramic body being impregnated with $PbO_2$ as the active electrode material.

8. A lead-acid battery according to claim 5, wherein the negative electrode support means comprises a ceramic body comprising from ceramic needles welded together at their respective contact points such that the resulting electrode support means is substantially rigid and non-compressible, said ceramic body being impregnated with Pb as the active material.

9. A lead-acid battery according to claim 8, wherein the positive electrode support means comprises a ceramic body comprising ceramic needles welded together at their respective contact points such that the resulting separator body is substantially rigid and non-compressible, said ceramic body being impregnated with $PbO_2$ as the active electrode material.

10. A lead-acid battery according to claim 7, said battery further comprising a current collector in electrical contact with the active electrode material supported in the negative electrode, said collector being in contact with the negative terminal of the battery.

11. A lead-acid battery according to claim 8, said battery further comprising a current collector in electrical contact with the active electrode material supported in the positive electrode, said collector being in contact with the positive terminal of the battery.

12. A lead-acid battery according to claim 10, wherein the current collector is comprised of a lead-containing foil.

13. A lead-acid battery according to claim 11, wherein the current collector is comprised of a lead-containing foil.

14. A lead-acid battery according to claim 12, wherein the foil is no more than about 0.01 inches in thickness.

15. A lead-acid battery according to claim 13, wherein the foil is no more than about 0.01 inches in thickness.

* * * * *